United States Patent
Suzuki

(10) Patent No.: US 11,292,386 B2
(45) Date of Patent: Apr. 5, 2022

(54) VEHICLE INTERIOR LIGHTING SYSTEM FOR ILLUMINATING AN INTERIOR OF A VEHICLE BASED ON A PREDICTED MOVEMENT INTENTION OF AN OBJECT PERSON

(71) Applicant: Yazaki Corporation, Tokyo (JP)

(72) Inventor: Masashi Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 24 days.

(21) Appl. No.: 16/437,215

(22) Filed: Jun. 11, 2019

(65) Prior Publication Data

US 2020/0001783 A1    Jan. 2, 2020

(30) Foreign Application Priority Data

Jun. 27, 2018    (JP) .............................. JP2018-122047

(51) Int. Cl.
| | |
|---|---|
| *G06T 7/00* | (2017.01) |
| *B60Q 3/51* | (2017.01) |
| *G06T 7/73* | (2017.01) |
| *B60Q 3/62* | (2017.01) |
| *B60Q 3/74* | (2017.01) |
| *H04N 13/204* | (2018.01) |
| *H04N 13/117* | (2018.01) |

(Continued)

(52) U.S. Cl.
CPC .............. *B60Q 3/51* (2017.02); *B60Q 3/62* (2017.02); *B60Q 3/74* (2017.02); *F21S 8/04* (2013.01); *G02B 6/0018* (2013.01); *G02B 6/0033* (2013.01); *G06T 7/73* (2017.01); *H04N 13/117* (2018.05); *H04N 13/204* (2018.05); *G06T 2207/30268* (2013.01)

(58) Field of Classification Search
CPC .... B60Q 3/51; B60Q 3/62; B60Q 3/74; G06T 7/73; G06T 2207/30268; H04N 13/204; H04N 13/117; F21S 8/04; G02B 6/0018; G02B 6/0033
See application file for complete search history.

(56) References Cited

U.S. PATENT DOCUMENTS

| | | | |
|---|---|---|---|
| 9,031,610 B2 * | 5/2015 | Kulas ................. | H04M 1/0254 455/556.1 |
| 9,966,985 B2 * | 5/2018 | DiLaura ............. | H04M 1/0264 |
| 10,579,108 B2 * | 3/2020 | Dilaura ............... | G06F 1/1686 |

(Continued)

FOREIGN PATENT DOCUMENTS

| | | |
|---|---|---|
| DE | 102006041856 A1 | 3/2007 |
| GB | 2525655 A | 11/2015 |
| JP | 2018-062299 A | 4/2018 |

*Primary Examiner* — Pakee Fang
(74) *Attorney, Agent, or Firm* — Sughrue Mion, PLLC

(57) ABSTRACT

A vehicle interior lighting system includes an illuminating unit provided in an interior of a vehicle, an imaging unit that captures a depth image including a distance to an object person in the interior, an estimating unit that estimates a three-dimensional human body model of an object person from a depth image captured by the imaging unit, a predicting unit that predicts a movement intention of an object person in an interior based on the human body model estimated by the estimating unit, and an operation controller that controls lighting of the illuminating unit according to the movement intention predicted by the predicting unit.

7 Claims, 7 Drawing Sheets

(51) Int. Cl.
*F21S 8/04* (2006.01)
*F21V 8/00* (2006.01)

(56) References Cited

U.S. PATENT DOCUMENTS

| | | |
|---|---|---|
| 2007/0109785 A1 | 5/2007 | Wittorf et al. |
| 2009/0092284 A1* | 4/2009 | Breed .................... B60N 2/002 382/103 |
| 2010/0014711 A1* | 1/2010 | Camhi .................... B60Q 3/80 382/104 |
| 2010/0182425 A1* | 7/2010 | Sakaki .................. B60N 2/002 348/135 |
| 2013/0253779 A1* | 9/2013 | Fujii ..................... B60N 2/919 701/49 |
| 2017/0043712 A1 | 2/2017 | Paszkowicz et al. |
| 2017/0270924 A1 | 9/2017 | Fleurence et al. |

* cited by examiner

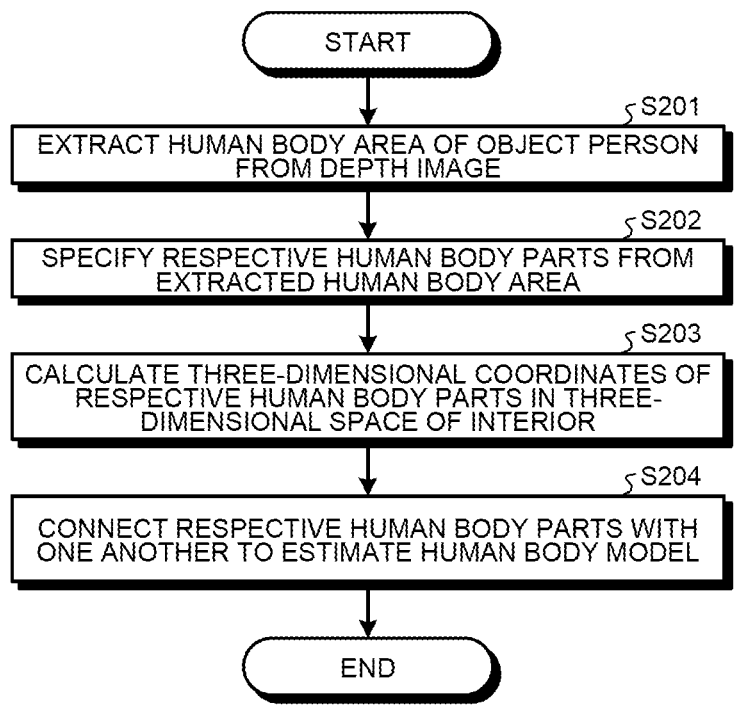

VEHICLE INTERIOR LIGHTING SYSTEM FOR ILLUMINATING AN INTERIOR OF A VEHICLE BASED ON A PREDICTED MOVEMENT INTENTION OF AN OBJECT PERSON

CROSS-REFERENCE TO RELATED APPLICATION(S)

The present application claims priority to and incorporates by reference the entire contents of Japanese Patent Application No. 2018-122047 filed in Japan on Jun. 27, 2018.

BACKGROUND OF THE INVENTION

1. Field of the Invention

The present invention relates to a vehicle interior lighting system.

2. Description of the Related Art

In an interior of a vehicle, a vehicle interior lighting device for illuminating the vehicle interior is disposed. For example, Japanese Patent Application Laid-open No. 2018-62299 discloses a vehicle interior lamp that is operated by an occupant of a vehicle, provided with a switch for turning on/off an LED, and disposed on a wall surface such as a ceiling of a vehicle interior.

By the way, with the vehicle interior light described in the above-mentioned Japanese Patent Application Laid-open No. 2018-62299, when an occupant moves to a target position in a vehicle difficult to operate a switch at night, for example, the occupant moves to a position of the switch to operate the switch or needs to ask a driver, other occupants, or the like to operate the switch.

SUMMARY OF THE INVENTION

The present invention has been made in view of the above circumstances, and it is an object of the present invention to provide a vehicle interior lighting system capable of improving convenience of an object person who moves in a vehicle.

In order to solve the above mentioned problem and achieve the object, a vehicle interior lighting system according to one aspect of the present invention includes an illuminating unit provided in an interior of a vehicle; an imaging unit that captures a depth image including a distance to an object person in the interior; an estimating unit that estimates a three-dimensional human body model of the object person from the depth image captured by the imaging unit; a predicting unit that predicts a movement intention of the object person in the interior based on the human body model estimated by the estimating unit; and an operation controller that controls lighting of the illuminating unit according to the movement intention predicted by the predicting unit.

According to another aspect of the present invention, in the vehicle interior lighting system, it is preferable that the illuminating unit has a plurality of lighting devices, and the operation controller turns on the lighting devices near the object person whose movement intention is predicted by the predicting unit.

According to still another aspect of the present invention, in the vehicle interior lighting system, it is preferable that the predicting unit predicts a destination of the object person in the interior based on the human body model estimated by the estimating unit, and the operation controller turns on the lighting devices at the destination predicted by the predicting unit.

According to still another aspect of the present invention, in the vehicle interior lighting system, it is preferable that the operation controller turns off the lighting devices that have been turned on at an origin of the object person when turning on the lighting devices at the destination.

According to still another aspect of the present invention, in the vehicle interior lighting system, it is preferable that the predicting unit predicts an intention to end moving of the object person moving in the interior based on the human body model estimated by the estimating unit, and the operation controller terminates lighting of the illuminating unit according to the intention to end moving predicted by the predicting unit.

According to still another aspect of the present invention, in the vehicle interior lighting system, it is preferable that a housing that is provided on a surface of a ceiling of the vehicle on a side of the interior and incorporates the imaging unit, the estimating unit, the predicting unit, and the operation controller.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart illustrating an example of estimation processing of a human body model of the vehicle interior lighting system according to the embodiment.

DETAILED DESCRIPTION OF THE PREFERRED EMBODIMENTS

Embodiments of the present invention will be described below in detail with reference to the drawings. This invention is not limited to these embodiments. In addition, constituent elements in the embodiments described below include those that are replaceable by those skilled in the art and easy, or those substantially identical.

Embodiments

Figure 1:
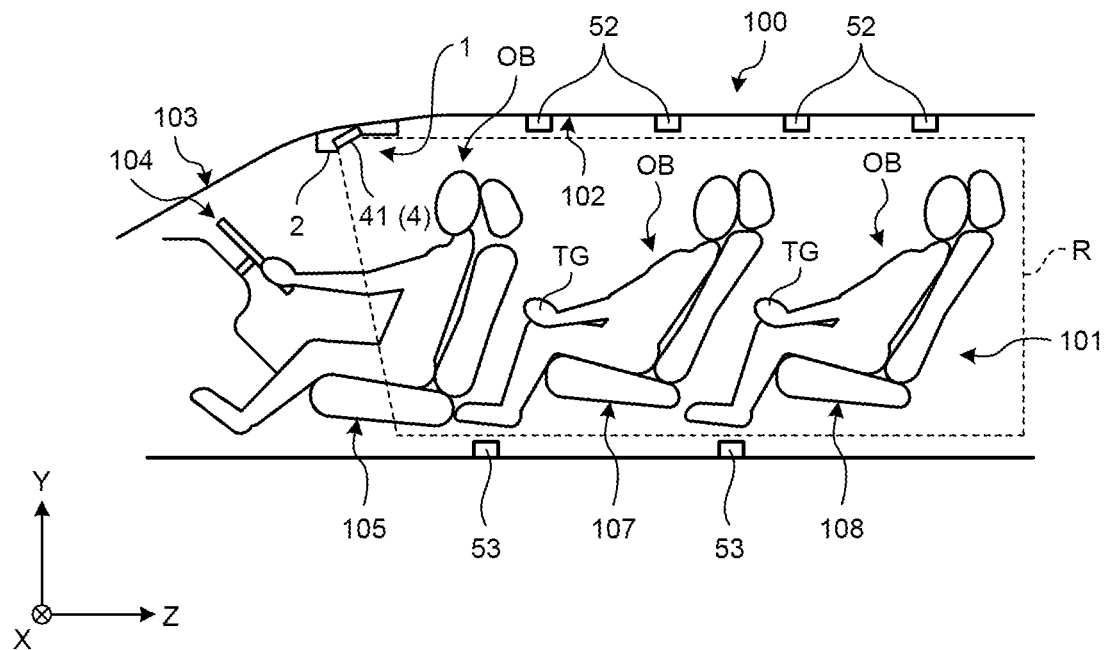
FIG. 1 is a schematic diagram illustrating a schematic configuration of a vehicle interior to which a vehicle interior lighting system according to an embodiment is applied.
Figure 2:
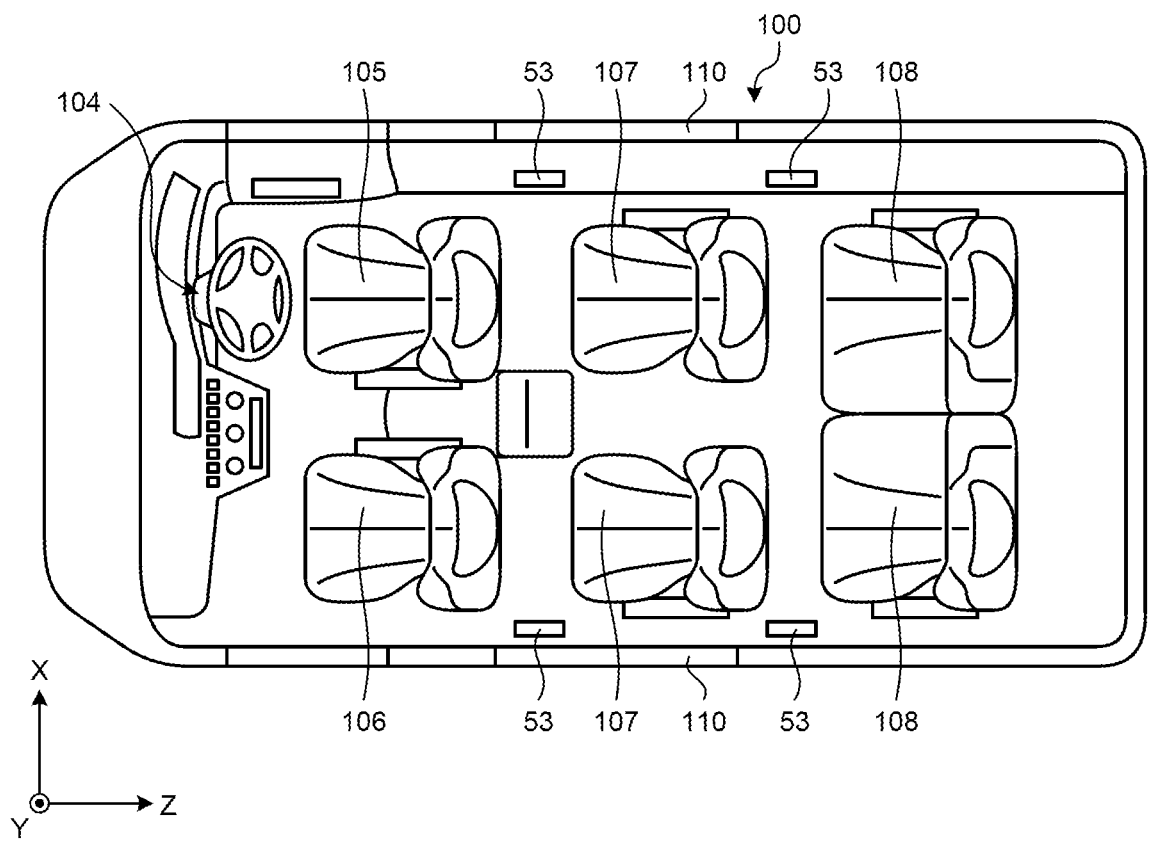
FIG. 2 is a schematic diagram illustrating the vehicle interior to which the vehicle interior lighting system according to the embodiment is applied.
Figure 3:
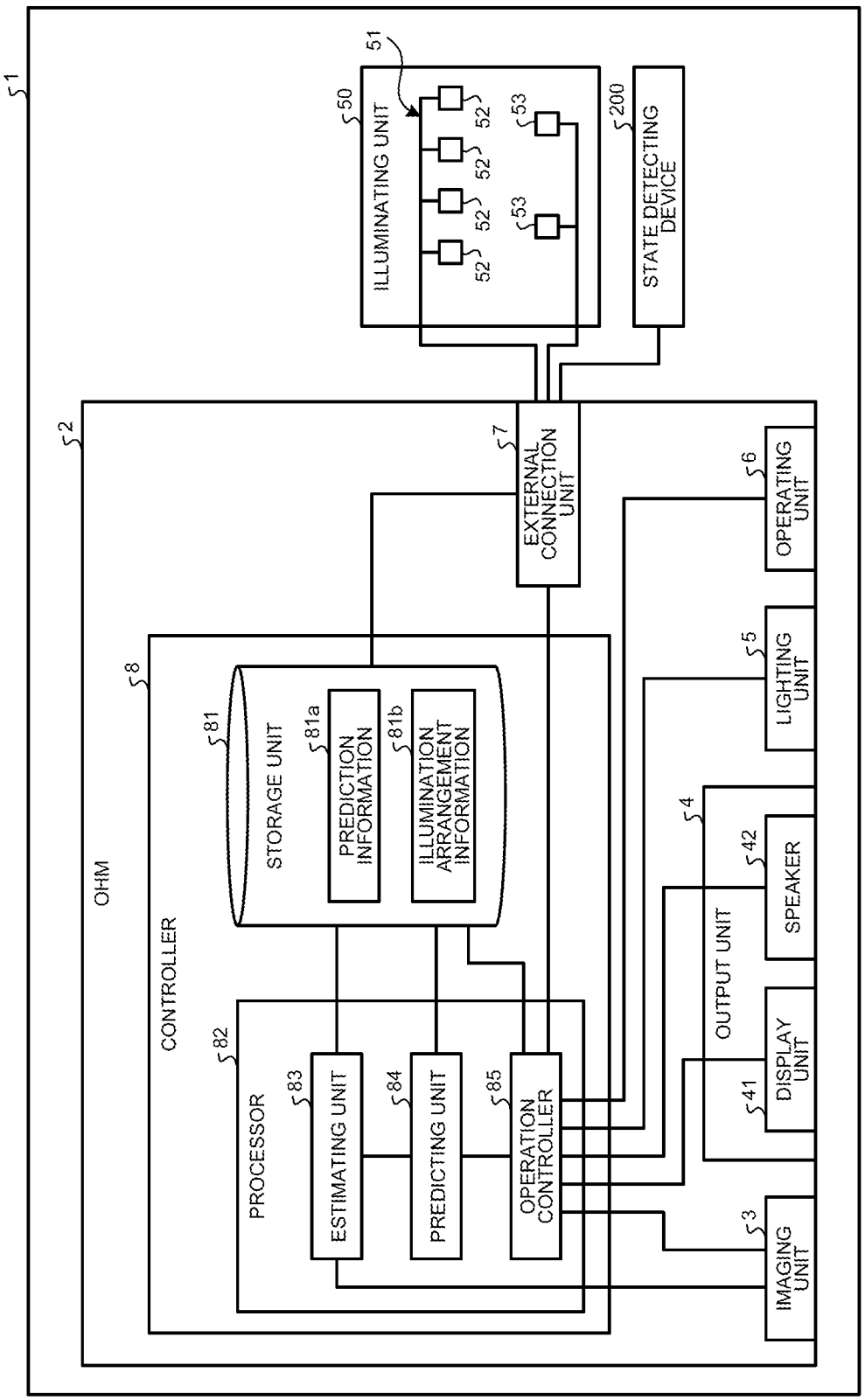
FIG. 3 is a block diagram illustrating a schematic configuration of the vehicle interior lighting system according to the embodiment.
Figure 4:
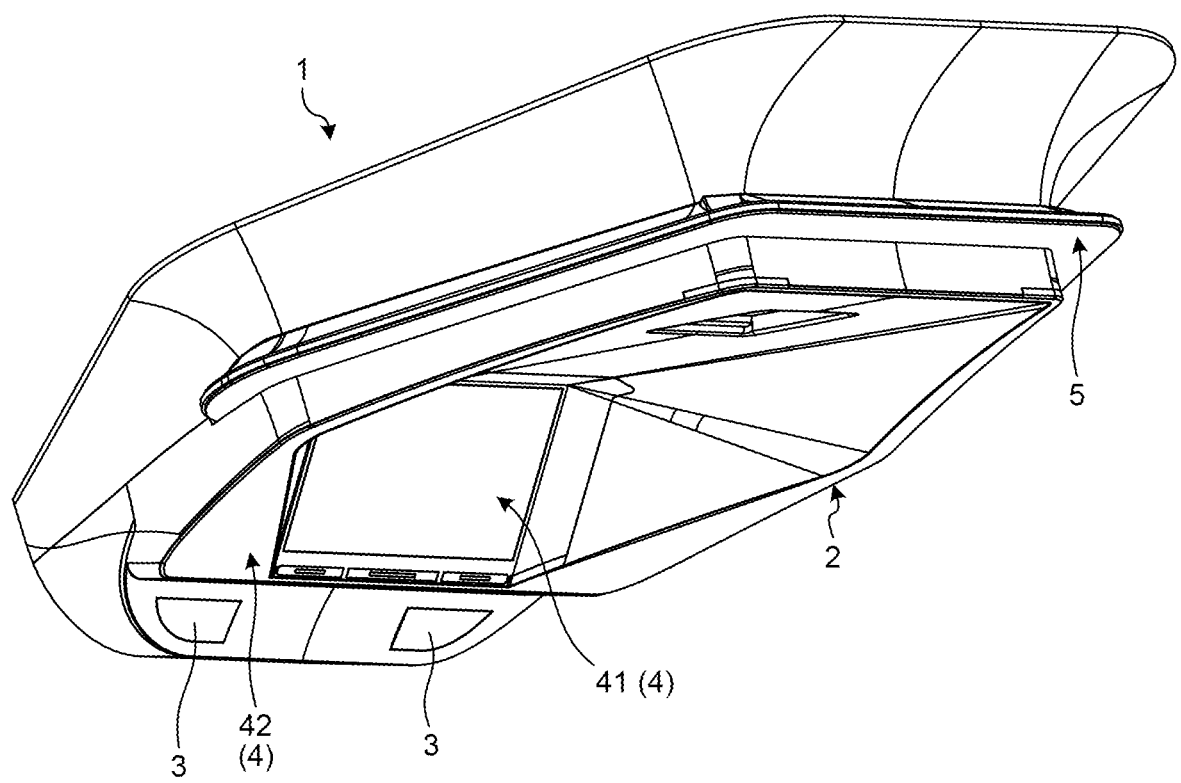
FIG. 4 is a perspective view illustrating an appearance of the vehicle interior lighting system according to the embodiment.
Figure 5:
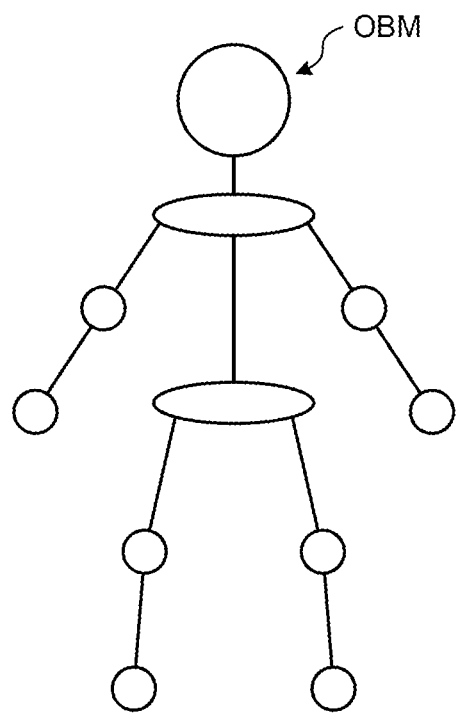
FIG. 5 is a diagram illustrating an example of a human body model estimated by the vehicle interior lighting system according to the embodiment.

Embodiments will be described with reference to FIGS. 1 to 5. FIG. 1 is a schematic diagram illustrating a schematic configuration of a vehicle interior to which a vehicle interior lighting system according to an embodiment of the present invention is applied. FIG. 2 is a schematic diagram illustrating the vehicle interior to which the vehicle interior lighting system according to the embodiment is applied. FIG. 3 is a block diagram illustrating a schematic configuration of the vehicle interior lighting system according to the embodiment. FIG. 4 is a perspective view illustrating an appearance of the vehicle interior lighting system according to the embodiment. FIG. 5 is a diagram illustrating an example of a human body model estimated by the vehicle interior lighting system according to the embodiment. A direction of an arrow X illustrated in FIGS. 1 and 2 is a vehicle width direction of a vehicle 100. A direction of an arrow Y illustrated in FIGS. 1 and 2 is a height direction of the vehicle 100. A direction of an arrow Z illustrated in FIGS. 1 and 2 is a longitudinal direction (front-rear direction) of the vehicle 100. In the following description, the vehicle 100 may be referred to as "the vehicle" in some cases.

A vehicle interior lighting system 1 according to the present embodiment illustrated in FIG. 1 is an in-vehicle system that is mounted in the vehicle 100 and executes various processing to an illuminating unit 50 provided in an interior 101 of the vehicle 100. The vehicle interior lighting system 1 controls lighting of the illuminating unit 50 according to movement of an object person OB in the interior 101. An object person OB is a person who receives lighting service by the vehicle interior lighting system 1. An object person OB is an occupant who gets into the interior 101 of the vehicle 100 and includes a driver of the vehicle 100 and fellow occupants other than the driver.

In the examples illustrated in FIGS. 1 and 2, the vehicle 100 includes a driver's seat 105, a front passenger seat 106, rear seats 107 in a second row, and rear seats 108 in a third row. The vehicle 100 is, for example, a vehicle capable of walk-through. In other words, the vehicle 100 is a vehicle that allows movement in the interior 101 between the rear seats 107 in the second row and the rear seats 108 in the third row without tilting the seats. As an example, an object person OB of the present embodiment will be described as fellow occupants of the rear seats 107 and 108 of the vehicle 100. In the present embodiment, a case where the vehicle 100 is an automobile is described, but the vehicle 100 may be a bus or a truck, for example.

In the example illustrated in FIG. 2, the vehicle 100 includes a rear door 110 through which an object person OB gets on and off. The whole vehicle interior lighting system 1 of the present embodiment is provided on a surface of a ceiling 102 of the vehicle 100 on a side of the interior 101 and constitutes an over-head module (OHM) integrating various functions.

Hereinafter, a configuration of the vehicle interior lighting system 1 will be described in detail with reference to FIGS. 1, 2, 3, 4, and 5.

The vehicle interior lighting system 1 includes a housing 2, an imaging unit 3, an output unit 4, a lighting unit 5, an operating unit 6, an external connection unit 7, a controller 8, and the illuminating unit 50. In addition, the vehicle interior lighting system 1 constituting the overhead module may further include, for example, a wireless communication unit, an antenna, and a power distribution unit. In the present embodiment, a case where the vehicle interior lighting system 1 includes the lighting unit 5 and the illuminating unit 50 will be described, but at least the illuminating unit 50 may be included.

The housing 2 houses a part of the vehicle interior lighting system 1. The housing 2 is formed in a hollow box shape as a whole by combining a plurality of members. The housing 2 is formed of a synthetic resin having insulating properties. Here, the housing 2 incorporates and houses the imaging unit 3, the output unit 4, the lighting unit 5, the operating unit 6, the external connection unit 7, and the controller 8 inside and unitizes them as an overhead module. In the housing 2, a part of the imaging unit 3, the output unit 4, the lighting unit 5, the operating unit 6, and the external connection unit 7 housed inside are exposed on an outer surface. The housing 2 of the present embodiment is provided on a surface of the ceiling (roof panel) 102 of the vehicle 100 on the side of the interior 101. The ceiling 102 is a structure connected to a vehicle main body via, for example, a pillar and supported on an upper side of the vehicle main body in a vertical direction. The vehicle 100 is divided into the interior 101 and an exterior, with the ceiling 102 as a boundary on the upper side in the vertical direction. Here, for example, the housing 2 is provided at an intersection between the ceiling 102 and a windshield 103 and at a substantially central position of the vehicle 100 in the vehicle width direction.

The imaging unit 3 includes a three-dimensional time of flight (TOF) camera, a range image sensor, and the like that measure a distance to an object person OB in the interior 101 of the vehicle 100. The imaging unit 3 captures a depth image including pixels in which a distance to an object person OB and a pixel value are associated with each other. The imaging unit 3 of the present embodiment has a function of capturing a depth image that allows measurement of a three-dimensional position of a portion subject to monitoring of an object person OB in the interior 101. A portion subject to monitoring includes, for example, a head and an upper body of an occupant. In the present embodiment, the imaging unit 3 enables capturing an image of an object person OB even in a dark environment by using the TOF camera. In the example illustrated in FIG. 1, the imaging unit 3 sets the interior 101 of the vehicle 100 that can be illuminated by the illuminating unit 50 as an imaging range R.

For example, the imaging unit 3 is provided in the housing 2 such that a lens is arranged inside the housing 2 and an optical axis is directed toward the driver's seat 105 and the rear seats 107 in the interior 101. Light from the imaging unit 3 and light received by the imaging unit 3 are transmitted through a transmission unit of the housing 2. The imaging unit 3 is electrically connected to the controller 8 and capable of exchanging electrical signals with each other, and operation of each unit is controlled by the controller 8. For example, the imaging unit 3 outputs a captured depth image to the controller 8. Note that the imaging unit 3 may be provided in the housing 2 such that a lens is exposed on the outer surface of the housing 2.

The output unit 4 outputs various kinds of information toward the interior 101 of the vehicle 100. Here, the output unit 4 includes a display unit 41 and a speaker 42. The display unit 41 is a display device that outputs visual information (graphic information, character information). The display unit 41 is constituted by, for example, a thin liquid crystal display, a plasma display, and an organic EL display. The speaker 42 is an output device that outputs auditory information (voice information, sound information). The display unit 41 and the speaker 42 constituting the output unit 4 are electrically connected to the controller 8, respectively and capable of exchanging electrical signals with each other, and operation of each unit is controlled by the controller 8.

The lighting unit 5 illuminates the interior 101 of the vehicle 100 and is, for example, a map lamp. The lighting unit 5 is electrically connected to the controller 8 and capable of exchanging electrical signals with each other, and operation of each unit is controlled by the controller 8.

The operating unit 6 is an operating device that allows input of various types of operation from the interior 101 of the vehicle 100. The operating unit 6 is constituted by, for example, a push button, a capacitive touch switch, and a non-contact type sensor such as an infrared sensor. The operating unit 6 is electrically connected to the controller 8 and capable of exchanging electrical signals with each other, and operation of each unit is controlled by the controller 8.

The external connection unit 7 is a section to which an electrical device external to the housing 2 is electrically connected. The external connection unit 7 is constituted by various types of connectors and an interface unit. The illuminating unit 50 is electrically connected to the external connection unit 7.

The illuminating unit 50 illuminates, for example, the rear seats 107 and 108 in the interior 101 of the vehicle 100. The illuminating unit 50 is electrically connected to the controller 8 via the external connection unit 7 and capable of exchanging electrical signals with each other, and operation of each unit is controlled by the controller 8. The illuminating unit 50 has a plurality of lighting devices 51. The lighting devices 51 are arranged in the interior 101. The lighting devices 51 of the present embodiment include downlights 52 and foot lamps 53. The downlights 52 are the lighting devices 51 that are provided on the ceiling 102 of the vehicle 100 and illuminate an area below where provided. The foot lamps 53 are the lighting devices 51 that are provided on, for example, an edge of a floor of the vehicle 100 and illuminate feet of an object person OB. For example, the lighting devices 51 may be one of the downlights 52 and the foot lamps 53 or may include a room lamp. The downlights 52 and the foot lamps 53 of the present embodiment are switchable between a full lighting state of each light and each lamp and a first lighting state in which lighting is performed with illuminance lower than the full lighting state.

The external connection unit 7 is electrically connected to an electronic controller (ECU) that integrally controls each unit of the vehicle 100, a rear module that is provided at a position on a rear seat side of a surface of the ceiling 102 of the vehicle 100 on the side of the interior 101, and the like. The external connection unit 7 is electrically connected to the controller 8 and an electric device external to the housing 2 and capable of exchanging electrical signals with each other.

In the example illustrated in FIG. 3, in addition to the above-described illuminating unit 50, for example, a state detecting device 200 is electrically connected to the external connection unit 7. The state detecting device 200 detects various kinds of information. The state detecting device 200 detects, for example, vehicle state information and surrounding state information. Vehicle state information is information indicating a running state of the vehicle 100. Surrounding state information is information indicating a surrounding state of the vehicle 100. Vehicle state information may include, for example, vehicle speed information of the vehicle 100, seat belt information indicating presence or absence of a seat belt attachment, and stored charge amount information of a power storage device. Surrounding state information may include, for example, information indicating illuminance around the vehicle 100 and surrounding environment.

The controller 8 is a section that integrally controls each unit of the vehicle interior lighting system 1. The controller 8 executes various arithmetic processing relating to state monitoring of an object person OB and various supports. The controller 8 includes a central processing unit such as a central processing unit (CPU), a micro processing unit (MPU), an application specific integrated circuit (ASIC), and a field programmable gate array (FPGA), a read only memory (ROM), a random access memory (RAM), and an electronic circuit mainly including a well-known microcomputer including an interface. The controller 8 is electrically connected to the imaging unit 3, the output unit 4, the lighting unit 5, the operating unit 6, and the external connection unit 7. The controller 8 can exchange with each unit various electric signals such as image signals corresponding to a depth image captured by the imaging unit 3 and drive signals for driving each unit.

Specifically, the controller 8 functionally and conceptually includes a storage unit 81 and a processor 82. The storage unit 81 and the processor 82 can exchange various kinds of information with various devices electrically connected. The storage unit 81 is a storage device such as a memory. The storage unit 81 stores conditions and information necessary for various types of processing in the controller 8, various programs executed by the controller 8, and the like. The storage unit 81 also stores visual information such as partial images displayed on the display unit 41 and auditory information such as sounds output by the speaker 42. The storage unit 81 can also temporarily store information on a depth image captured by the imaging unit 3 and various information acquired via the external connection unit 7. In the storage unit 81, the processor 82 reads various information as necessary. The processor 82 executes various programs stored in the storage unit 81 based on, for example, various input signals and outputs various output signals to each unit by operating the programs to execute various processing for realizing various functions.

In the example illustrated in FIG. 3, the storage unit 81 can store prediction information 81a and illumination arrangement information 81b. The prediction information 81a is information in which a result of learning a movement intention that an object person OB intends to move is reflected by various methods using artificial intelligence techniques and deep learning techniques In other words, the prediction information 81a is a database formed by various methods using artificial intelligence techniques and deep learning techniques in order to predict a movement intention of an object person OB. For example, a movement intention of an object person OB seated in a seat in the interior 101 can be predicted by perceiving that a head of an object person OB is greatly inclined forward, or that an upper body of an object person OB moves in the interior 101. In addition, a movement intention can be classified into, for example, an intention to start moving, an intention to continue moving, and an intention to end moving. An intention to start moving is a psychological effect of an object person OB who intends to start moving. An intention to start moving can be predicted by, for example, perceiving a movement of an object person OB to rise from a seat to direct the upper body toward, for example, an aisle of the interior 101. Further, an intention to continue moving is a psychological effect of an object person OB who intends to continue moving. An intention to continue moving can be predicted by, for example, perceiving a movement of an object person OB to continue moving the upper body. An intention to end moving is a psychological effect of an object person OB who intends to end moving. An intention to end moving can be predicted by, for example, perceiving a movement of an object person OB to sit in a destination seat. In the present embodiment, the prediction information 81*a* is a database of information for perceiving movement according to a movement intention of an object person OB based on a three-dimensional human body model.

The illumination arrangement information 81*b* is information indicating arrangement of the lighting devices 51 of the illuminating unit 50 in the interior 101. The illumination arrangement information 81*b* includes, for example, information indicating identification information of each lighting device 51 of the illuminating unit 50 and position information in the interior 101. An example of the illumination arrangement information 81*b* will be described later.

More specifically, the processor 82 functionally and conceptually includes an estimating unit 83, a predicting unit 84, and an operation controller 85. By executing a program, the processor 82 realizes the estimating unit 83, the predicting unit 84, and the operation controller 85.

The estimating unit 83 estimates a three-dimensional human body model of an object person OB from a depth image captured by the imaging unit 3. For example, the estimating unit 83 extracts an object person OB from a depth image by a background subtraction method, Random Forest, a Mean Shift method, pattern matching, or the like, and estimates a human body model based on, for example, an outline of the object person OB. A human body model OBM illustrated in FIG. 5 is a model illustrating a skeleton position of an object person OB. In the example illustrated in FIG. 5, the human body model OBM characteristically illustrates human body parts of a head, shoulders, elbows, hands, hips, knees and feet of an object person OB. The estimating unit 83 extracts an object person OB from a depth image based on a distance between pixels and pixel values of the depth image and estimates a human body model OBM with attention to a skeleton position of the object person OB. An example of estimation processing of a human body model OBM will be described later. The estimating unit 83 estimates each human body part of the estimated human body model OBM and calculates three-dimensional coordinates of each human body part in a three-dimensional space of the interior 101. The estimating unit 83 stores the calculated three-dimensional coordinates of each human body part in the storage unit 81 in association with a frame of a depth image.

The predicting unit 84 predicts a movement intention of an object person OB in the interior 101 based on a human body model OBM of an object person OB estimated by the estimating unit 83. For example, the predicting unit 84 estimates an optical flow of a human body model OBM and perceives a state and a process of a human body model OBM based on the optical flow. As a method for estimating an optical flow of a human body model OBM, for example, a Lucas Kanade method or a Horn-Schunk method can be used. Then, based on the perceived state and process of a human body model, the prediction information 81*a* stored in a storage unit 81, and the like, the predicting unit 84 perceives a movement of a human body model OBM and predicts a movement intention of an object person OB according to the movement. For example, when perceiving a movement of a human body model OBM to rise from a seat to face toward an aisle, the predicting unit 84 predicts an intention to start moving as a movement intention of an object person OB. For example, when perceiving a movement of a human body model OBM to move down an aisle of the interior 101, the predicting unit 84 predicts an intention to continue moving as a movement intention of an object person OB. For example, when perceiving a movement of a human body model OBM who has moved to sit in a seat, the predicting unit 84 predicts an intention to end moving as a movement intention of an object person OB. Further, the predicting unit 84 predicts a destination of an object person OB in the interior 101 based on a human body model OBM estimated by the estimating unit 83. For example, the predicting unit 84 predicts a destination of a human body model OBM based on a position and a direction (moving direction) of a human body model OBM based on an optical flow and map information of the interior 101. It should be noted that map information is information indicating arrangement and coordinates of seats, an aisle, and the like in the interior 101 of the vehicle 100 and is stored in advance in the storage unit 81. Further, for example, when an object person OB sitting on the rear seat 107 approaches the rear seat 108, the predicting unit 84 predicts the rear seat 108, an aisle toward the rear seat 108, or the like as a destination. The predicting unit 84 stores in the storage unit 81 information indicating prediction results such as a movement intention and a destination of an object person OB.

The operation controller 85 is a section capable of executing operation control processing. Operation control processing is processing for controlling operation of each unit of the vehicle interior lighting system 1 such as the imaging unit 3, the output unit 4, the lighting unit 5, and the operating unit 6. The operation controller 85 is electrically connected to the imaging unit 3, the output unit 4 (the display unit 41, the speaker 42), the lighting unit 5, the operating unit 6, the external connection unit 7, and the storage unit 81. The operation controller 85 controls operation of the imaging unit 3 by outputting a drive signal to the imaging unit 3 to make it possible to start capturing of a depth image including an object person OB or terminate the capturing. Further, the operation controller 85 controls operation of the output unit 4 by outputting a drive signal to the output unit 4 (the display unit 41, the speaker 42) to make it possible to display visual information on the display unit 41 or output auditory information by the speaker 42. Further, the operation controller 85 controls operation of the lighting unit 5 by outputting a drive signal to the lighting unit 5 to make it possible to turn on or off the lighting unit 5. Further, the operation controller 85 receives operation input to the operating unit 6 based on an operation signal input from the operating unit 6 to make it possible to switch the lighting unit 5 and the illuminating unit 50 on and off, switch display contents by the display unit 41, or provide various settings.

Then, the operation controller 85 controls lighting of the illuminating unit 50 by outputting driving signals such as a turn-on signal and a turn-off signal to the downlights 52 and the foot lamps 53 of the illuminating unit 50 via the external connection unit 7 to make it possible to turn on or off the illuminating unit 50. The operation controller 85 can turn on/off the downlights 52 and the foot lamps 53 constituting the lighting devices 51, respectively.

The operation controller 85 has a function of turning on the lighting device 51 near an object person OB whose intention to start moving and intention to continue moving are predicted by the predicting unit 84. For example, the operation controller 85 specifies a current position in the interior 101 from three-dimensional coordinates of a human body model OBM. Then, based on the specified current position, a direction (moving direction) of a human body model OBM, and the illumination arrangement information 81b, the operation controller 85 specifies the lighting device 51 to be turned on from among the lighting devices 51. In other words, based on the specified current position, a direction (moving direction) of a human body model OBM, and the illumination arrangement information 81b, the operation controller 85 specifies at least one of the downlights 52 and the foot lamps 53 to be turned on from among the downlights 52 and the foot lamps 53. Then, the operation controller 85 turns on at least one of the specified downlights 52 and foot lamps 53 via the external connection unit 7.

The operation controller 85 has a function of turning on the lighting device 51 at a destination predicted by the predicting unit 84. For example, the operation controller 85 specifies a destination in the interior 101 from three-dimensional coordinates of a human body model OBM. Then, based on a current position, the destination, and the illumination arrangement information 81b, the operation controller 85 specifies at least one of the downlights 52 and the foot lamps 53 to be turned on from among the downlights 52 and the foot lamps 53. Then, the operation controller 85 turns on at least one of the specified downlights 52 and foot lamps 53.

The operation controller 85 has a function of turning off the lighting device 51 that has been turned on at an origin of an object person OB when turning on the lighting device 51 at a destination. For example, the operation controller 85 controls turning on/off of the downlights 52 and the foot lamp 53 by storing lighting states of the downlights 52 and the foot lamps 53 each in the storage unit 81.

The operation controller 85 has a function of terminating lighting of the illuminating unit 50 according to an intention to end moving predicted by the predicting unit 84. When an intention to end moving of an object person OB is predicted, the operation controller 85 terminates lighting service by the illuminating unit 50. For example, when the predicting unit 84 predicts an intention to end moving, the operation controller 85 outputs a signal requesting all of the downlights 52 and the foot lamps 53 to be turned off via the external connection unit 7. For example, when the predicting unit 84 predicts an intention to end moving, the operation controller 85 may output a signal requesting the downlight 52, the foot lamp 53, and the like that have been turned on to be turned off via the external connection unit 7.

The operation controller 85 outputs a request signal to the state detecting device 200 via the external connection unit 7 and can acquire the above-described vehicle state information and surrounding state information, for example. The operation controller 85 can control lighting of the illuminating unit 50 based on safety priority according to vehicle state information and surrounding state information, for example. For example, when surroundings such as night are dark, when an object person OB moves in the interior 101 while the vehicle 100 is moving, the operation controller 85 can turn on the illuminating unit 50 with the illuminating unit 50 in the above first lighting state. As a result, by illuminating the illuminating unit 50 vaguely, the vehicle interior lighting system 1 can prevent suddenly illuminating the interior 101 brightly and astonishing surroundings. In addition, when surroundings such as night are dark, when an object person OB moves in the interior 101 while the vehicle 100 is stopped, the operation controller 85 can also turn on the illuminating unit 50 with the illuminating unit 50 in the above full lighting state. As a result, the vehicle interior lighting system 1 can improve visibility of an object person OB by illuminating the interior 101 more brightly than the first lighting state by the illuminating unit 50.

Figure 6:
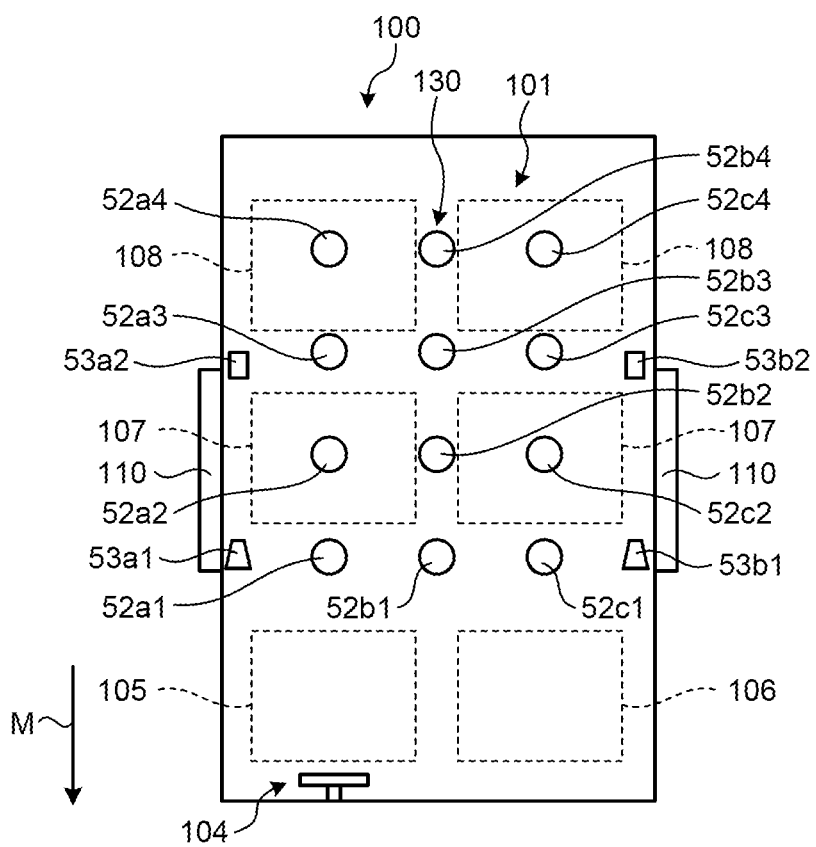
FIG. 6 is a schematic diagram illustrating an example of arrangement of an illuminating unit in the interior of the vehicle interior lighting system according to the embodiment.

Next, an example of arrangement of the illuminating unit 50 of the vehicle interior lighting system 1 will be described with reference to FIG. 6. FIG. 6 is a schematic diagram illustrating an example of arrangement of the illuminating unit 50 in the interior 101 of the vehicle interior lighting system 1 according to the present embodiment.

In the example illustrated in FIG. 6, the vehicle interior lighting system 1 has a configuration where the rear seats 107 and 108 in the interior 101 can be illuminated by the illuminating unit 50. In this case, the vehicle interior lighting system 1 is provided with the lighting devices 51 with the downlights 52 and the foot lamps 53 arranged side by side along a traveling direction M of the vehicle 100. In the vehicle interior lighting system 1, downlights 52a1, 52a2, 52a3, and 52a4 are provided above the rear seats 107 and 108 on a right side of the interior 101 side by side from before backward in the vehicle 100. In the vehicle interior lighting system 1, downlights 52b1, 52b2, 52b3, and 52b4 are provided above the aisle 130 between left and right rear seats 107 and 108 side by side from before backward in the vehicle 100. In the vehicle interior lighting system 1, downlights 52c1, 52c2, 52c3, and 52c4 are provided above the rear seats 107 and 108 on a left side of the interior 101 side by side from before backward in the vehicle 100. In the vehicle interior lighting system 1, foot lamps 53a1 and 53a2 are provided side by side from before backward in the vehicle 100 near feet of the rear seats 107 and 108 on the right side of the interior 101. In the vehicle interior lighting system 1, foot lamps 53b1 and 53b2 are arranged side by side from before backward in the vehicle 100 near the feet of the rear seats 107 and 108 on the left side of the interior 101.

In the present embodiment, the illumination arrangement information 81b of the storage unit 81 includes identification information and position information corresponding to each of the downlights 52a1, 52a2, 52a3, 52a4, 52b1, 52b2, 52b3, 52b4, 52c1, 52c2, 52c3, and 52c4. The illumination arrangement information 81b includes identification information and position information corresponding to each of the foot lamps 53a1, 53a2, 53b1, and 53b2. The illumination arrangement information 81b is described in a case where identification information and position information are included, but information indicating a lighting range and illuminance of the lighting devices 51, for example, may be included. For example, when a room lamp is provided in the interior 101, the illumination arrangement information 81b may include information on the room lamp.

Figure 7:
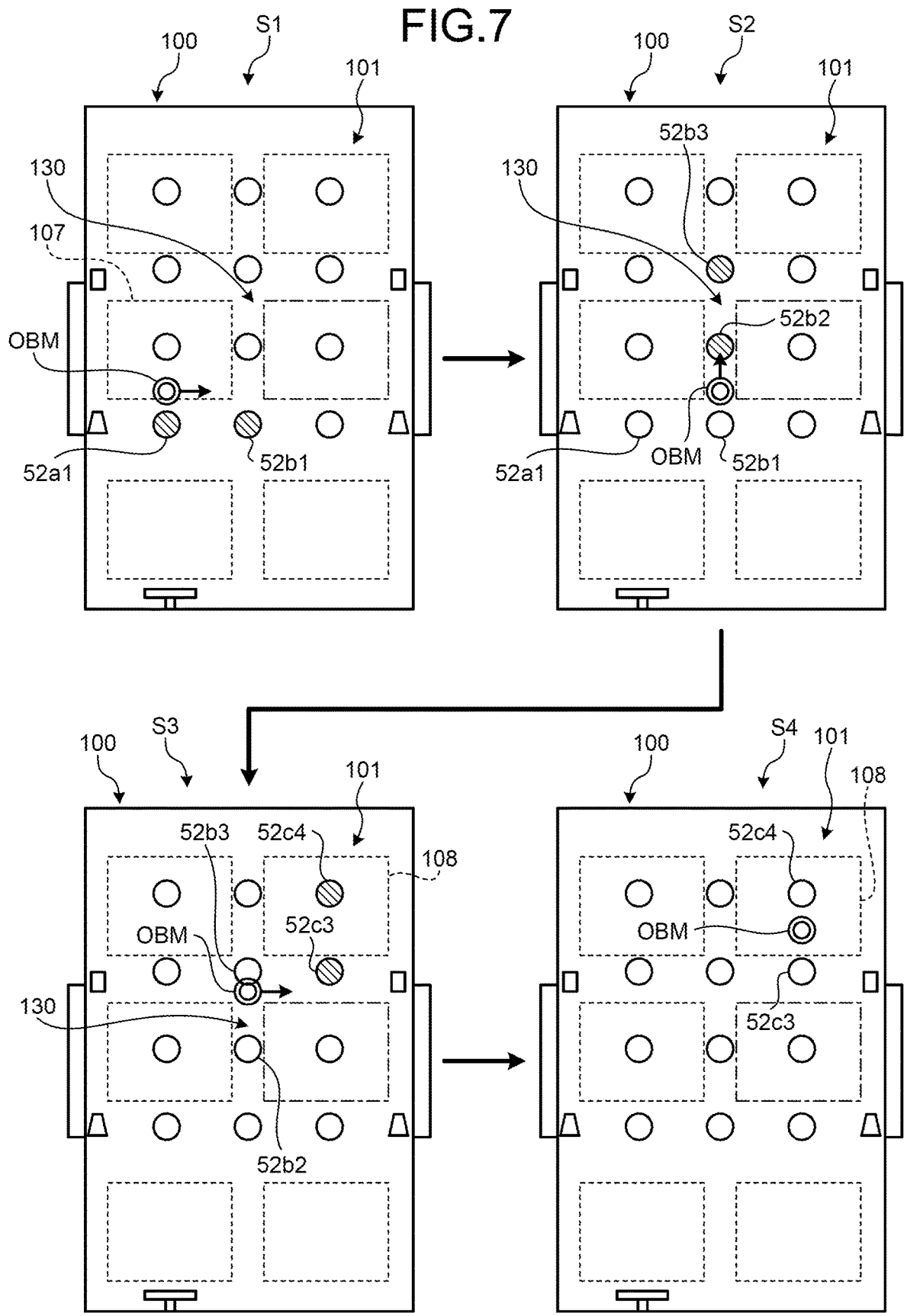
FIG. 7 is a diagram illustrating an example of operation of the illuminating unit of the vehicle interior lighting system according to the embodiment.

Next, operation of the illuminating unit 50 of the vehicle interior lighting system 1 according to the present embodiment will be described with reference to FIG. 7. FIG. 7 is a diagram illustrating an example of the operation of the illuminating unit 50 of the vehicle interior lighting system 1 according to the embodiment.

In a scene of step S1 illustrated in FIG. 7, an object person OB rises from the rear seat 107 on the right side of the interior 101 and intends to move an upper body toward the aisle 130 of the interior 101.

In the scene illustrated in step S1, the imaging unit 3 of the vehicle interior lighting system 1 captures a depth image including the object person OB seated in the right-side rear seat 107. The estimating unit 83 of the vehicle interior lighting system 1 estimates from the depth image a human body model OBM of the object person OB seated in the rear seat 107. In this case, the estimating unit 83 estimates a human body model OBM rising from the right-side rear seat 107 and directing an upper body toward the aisle 130 of the interior 101. Then, based on the estimated human body model OBM and the prediction information 81a, the predicting unit 84 predicts an intention to start moving as a movement intention of the object person OB. Then, based on a current position and a direction (moving direction) of the human body model OBM in the interior 101 and the illumination arrangement information 81b, the operation controller 85 specifies the downlights 52a1 and 52b1 close to and at a destination of the object person OB. Then, the operation controller 85 outputs a turn-on signal to the specified downlights 52a1 and 52b1 via the external connection unit 7. Then, the downlights 52a1 and 52b1 are turned on in the first lighting state according to the turn-on signal. As a result, the vehicle interior lighting system 1 can illuminate surroundings of the object person OB and a destination ahead thereof by the downlights 52a1 and 52b1.

In a scene of step S2, the object person OB moves from the rear seat 107 on the right side of the interior 101 to the aisle 130 and moves along the rear seat 107 with the upper body directed backward in the vehicle 100.

In the scene illustrated in step S2, the imaging unit 3 of the vehicle interior lighting system 1 captures a depth image including the object person OB moving along the aisle 130 beside the rear seat 107. The estimating unit 83 of the vehicle interior lighting system 1 estimates from the depth image a human body model OBM of the object person OB moving toward the rear seat 108. In this case, the estimating unit 83 estimates a human body model OBM moving along the aisle 130 with the upper body directed backward in the vehicle 100. Then, based on the estimated human body model OBM and the prediction information 81a, the predicting unit 84 predicts an intention to continue moving as a movement intention of the object person OB. Then, based on a current position and a direction (moving direction) of the human body model OBM in the interior 101 and the illumination arrangement information 81b, the operation controller 85 specifies the downlights 52b2 and 52b3 close to and at a destination of the object person OB. Then, the operation controller 85 outputs a turn-on signal to the specified downlights 52b2 and 52b3 via the external connection unit 7 and outputs a turn-off signal to the downlights 52a1 and 52b1 that are turned on at an origin. Then, the downlights 52b2 and 52b3 are turned on in the first lighting state according to the turn-on signal. The downlights 52a1 and 52b1 are turned off according to the turn-off signal. As a result, the vehicle interior lighting system 1 can illuminate surroundings of the object person OB moving backward along the aisle 130 and a destination thereof by the downlights 52b2 and 52b3.

In a scene of step S3, after moving backward along the aisle 130, the object person OB moves the upper body towards the rear seat 108 on the left side of the interior 101.

In the scene illustrated in step S3, the imaging unit 3 of the vehicle interior lighting system 1 images a depth image including the object person OB that moves near the rear seat 108 along the aisle 130 and directs the upper body toward the rear seat 108 on the left side of the interior 101. The estimating unit 83 of the vehicle interior lighting system 1 estimates from the depth image a human body model OBM of the object person OB moving toward the rear seat 108 on the left side of the interior 101. Then, based on the estimated human body model OBM and the prediction information 81a, the predicting unit 84 predicts an intention to continue moving as a movement intention of the object person OB. Then, based on a current position and a direction (moving direction) of the human body model OBM in the interior 101 and the illumination arrangement information 81b, the operation controller 85 specifies the downlights 52c3 and 52c4 close to and at a destination of the object person OB. Then, the operation controller 85 outputs a turn-on signal to the specified downlights 52c3 and 52c4 via the external connection unit 7 and outputs a turn-off signal to the downlights 52b2 and 52b3 that are turned on at an origin. The downlights 52c3 and 52c4 are turned on in the first lighting state according to the turn-on signal. The downlights 52b2 and 52b3 are turned off according to the turn-off signal. As a result, the vehicle interior lighting system 1 can illuminate surroundings of the object person OB moving from the aisle 130 toward the rear seat 108 on the left side of the interior 101 and the rear seat 108 or the destination by the downlights 52c3 and 52c4.

In a scene of step S4, the object person OB is seated in the rear seat 108 on the left side of the interior 101 with the upper body directed toward a front of the vehicle 100.

In the scene illustrated in step S4, the imaging unit 3 of the vehicle interior lighting system 1 captures a depth image including the object person OB seated in the rear seat 108 on the left side of the interior 101. The estimating unit 83 of the vehicle interior lighting system 1 estimates from the depth image a human body model OBM of the object person OB seated in the rear seat 108. Then, based on the estimated human body model OBM and the prediction information 81a, the predicting unit 84 predicts an intention to end moving as a movement intention of the object person OB. Then, the operation controller 85 outputs a turn-off signal to the illuminating unit 50 via the external connection unit 7. The illuminating unit 50 turns off the downlights 52c3 and 52c4 that are turned on. As a result, the vehicle interior lighting system 1 can terminate lighting by the illuminating unit 50 according to end of movement by the object person OB.

The vehicle interior lighting system 1 described above estimates a three-dimensional human body model OBM of an object person from a depth image captured by the imaging unit 3, predicts a movement intention of the object person OB in the interior 101 based on the human body model OBM, and controls lighting of the illuminating unit 50 according to the movement intention. As a result, the vehicle interior lighting system 1 can illuminate the illuminating unit 50 according to the movement intention of the object person OB predicted from the three-dimensional human body model OBM. Therefore, operation of the illuminating unit 50 becomes unnecessary, and convenience of the object person OB moving in the interior 101 can be improved.

In the vehicle interior lighting system 1, the operation controller 85 turns on the lighting device 51 near an object person OB whose movement intention is predicted by the predicting unit 84. As a result, the vehicle interior lighting system 1 can allow the object person OB to perceive presence or absence of an obstacle around the object person OB indicating a movement intention and thus can prevent the object person OB from touching the obstacle.

In the vehicle interior lighting system 1, the predicting unit 84 predicts a destination of an object person OB in the interior 101 based on a human body model OBM estimated by the estimating unit 83, and the operation controller 85 turns on the lighting device 51 at the destination predicted by the predicting unit 84. As a result, the vehicle interior lighting system 1 turns on the lighting device 51 at the predicted destination and causes an object person OB to perceive an object placed at the destination to make it possible to prevent the object person OB from breaking or touching the object. Therefore, safety of an object person OB moving in the interior 101 can be improved.

In the vehicle interior lighting system 1, when turning on the lighting device 51 at a destination of an object person OB, the operation controller 85 turns off the lighting device 51 that has been turned on at an origin of the object person OB. As a result, the vehicle interior lighting system 1 can improve, by enhancing the illuminating unit 50 such that the lighting devices 51 are turned on or off according to movement of an object person OB, convenience and a premium feel of the illuminating unit 50.

In the vehicle interior lighting system 1, the predicting unit 84 predicts an intention to end moving of an object person OB moving in the interior 101 based on a human body model OBM estimated by the estimating unit 83, and the operation controller 85 terminates lighting of the illuminating unit 50 according to the intention to end moving predicted by the predicting unit 84. As a result, the vehicle interior lighting system 1 can terminate lighting of the illuminating unit 50 according to prediction of an intention to end moving of an object person OB. Therefore, even if an object person OB remains at a destination, it is possible to prevent the lighting device 51 from being turned on continuously.

Since each unit of the vehicle interior lighting system 1 including the imaging unit 3, the estimating unit 83, the predicting unit 84, and the operation controller 85 is provided in the housing 2, the whole vehicle interior lighting system 1 can be unitized as an overhead module. With this configuration, the vehicle interior lighting system 1 can improve mountability in the vehicle 100.

Figure 8:
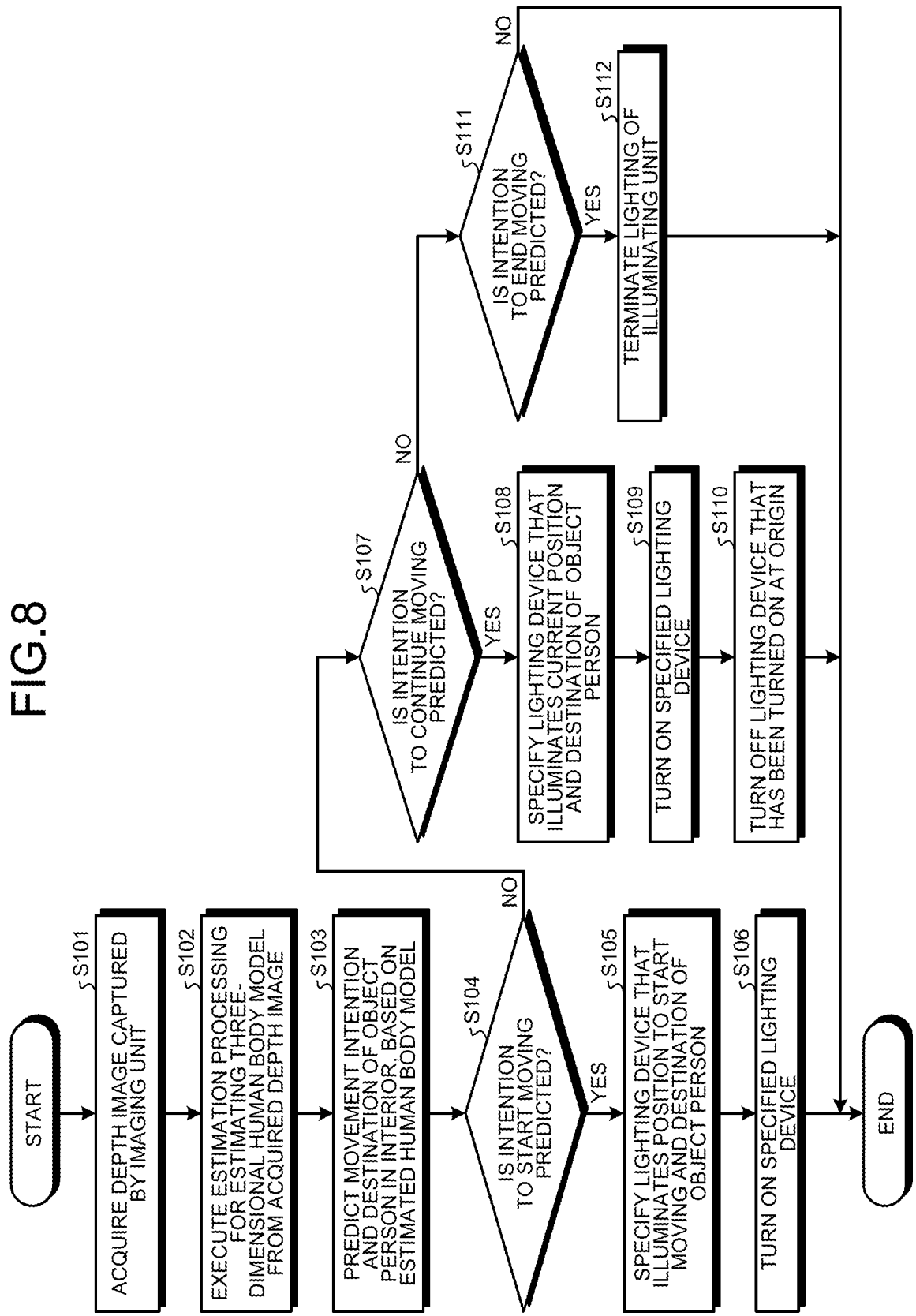
FIG. 8 is a flowchart illustrating an example of control by a controller of the vehicle interior lighting system according to the embodiment.

Next, an example of control by the processor 82 in the controller 8 will be described with reference to a flowchart of FIG. 8. FIG. 8 is a flowchart illustrating an example of control by the controller 8 of the vehicle interior lighting system 1 according to the embodiment. The flowchart illustrated in FIG. 8 illustrates an example of a processing procedure relating to control of the illuminating unit 50 according to a movement intention of an object person OB. The processing procedure illustrated in FIG. 8 is realized by executing a program by the processor 82. The processing procedure illustrated in FIG. 8 is repeatedly executed by the processor 82.

First, the processor 82 in the controller 8 of the vehicle interior lighting system 1 acquires a depth image captured by the imaging unit 3 (step S101). Then, the processor 82 executes estimation processing for estimating a three-dimensional human body model OBM from the acquired depth image (step S102). For example, the processor 82 extracts an object person OB based on a distance and a pixel value of each pixel of a depth image by executing estimation processing and estimates a human body model OBM with attention to a skeleton position of the object person OB. Details of the estimation processing will be described later. The processor 82 functions as the estimating unit 83 by executing the processing of step S102. Upon completion of the estimation processing, the processor 82 advances processing to step S103.

Based on the extracted human body model OBM, the processor 82 predicts a movement intention and a destination of the object person OB in the interior 101 (step S103). For example, the processor 82 estimates an optical flow of the human body model OBM and perceives a state and a process of the human body model OBM based on the optical flow. Based on the perceived state and process, a position, and a direction of the human body model OBM, map information of the interior 101, the prediction information 81a stored in the storage unit 81, and the like, the processor 82 perceives a movement of the human body model OBM and predicts a movement intention and a destination of the object person OB according to the movement. For example, when perceiving a movement of the human body model OBM to rise from a seat to face toward an aisle, the processor 82 predicts an intention to start moving as a movement intention of the object person OB. For example, when perceiving a movement of the human body model OBM to move along the aisle of the interior 101, the processor 82 predicts an intention to continue moving as a movement intention of the object person OB. For example, when perceiving a movement of the human body model OBM who has moved to sit in a seat, the processor 82 predicts an intention to end moving as a movement intention of the object person OB. After storing the predicted movement intention and a prediction result indicating a destination in the storage unit 81, the processor 82 advances processing to step S104.

The processor 82 determines whether an intention to start moving is predicted as a movement intention (step S104). For example, when the prediction result in step S103 indicates an intention to start moving, the processor 82 determines that an intention to start moving is predicted. When determining that an intention to start moving is predicted (Yes in step S104), the processor 82 advances processing to step S105.

The processor 82 specifies the lighting devices 51 that illuminate a position to start moving and a destination of the object person OB (step S105). For example, the processor 82 specifies the lighting devices 51 close to and at a destination of the object person OB, based on a current position and a direction (moving direction) of the estimated human body model OBM in the interior 101 and the illumination arrangement information 81b. Then, the processor 82 turns on the specified lighting devices 51 (step S106). For example, the processor 82 outputs a turn-on signal for turning on the specified lighting devices 51 to the illuminating unit 50 via the external connection unit 7. As a result, based on the turn-on signal, the illuminating unit 50 turns on the lighting device 51 near the object person OB who has started moving. Then, when turning on the specified lighting device 51, the processor 82 terminates the processing procedure illustrated in FIG. 8.

When determining that an intention to start moving is not predicted as a movement intention (No in step S104), the processor 82 advances processing to step S107. The processor 82 determines whether an intention to continue moving is predicted as a movement intention (step S107). For example, when the prediction result in step S103 indicates an intention to continue moving, the processor 82 determines that an intention to continue moving is predicted. When determining that an intention to continue moving is predicted (Yes in step S107), the processor 82 advances processing to step S108.

The processor 82 specifies the lighting devices 51 that illuminate a current position and a destination of the object person OB (step S108). For example, the processor 82 specifies the lighting devices 51 close to and at a destination of the object person OB, based on a current position and a direction (moving direction) of the estimated human body model OBM in the interior 101 and the illumination arrangement information 81b. Then, the processor 82 turns on the specified lighting devices 51 (step S109). Then, the processor 82 turns off the lighting device 51 that is turned on at an origin (step S110). For example, the processor 82 outputs a turn-off signal for turning off the lighting device 51 that has been turned on at an origin to the illuminating unit 50 via the external connection unit 7. As a result, the illuminating unit 50 turns on the lighting devices 51 close to and at a destination of a moving object person OB based on a turn-on signal and turns off the lighting device 51 that is turned on at an origin based on a turn-off signal. Then, when turning on the specified lighting device 51 and turning off the lighting device 51 at an origin, the processor 82 terminates the processing procedure illustrated in FIG. 8.

When determining that an intention to continue moving is not predicted as a movement intention (No in step S107), the processor 82 advances processing to step S111. The processor 82 determines whether an intention to end moving is predicted as a movement intention (step S111). For example, when the prediction result in step S103 indicates an intention to end moving, the processor 82 determines that an intention to end moving t is predicted. When determining that an intention to end moving is not predicted (No in step S111), the processor 82 terminates the processing procedure illustrated in FIG. 8. When determining that an intention to end moving is predicted (Yes in step S111), the processor 82 advances processing to step S112. The processor 82 terminates lighting of the illuminating unit 50 (step S112). For example, the processor 82 outputs a turn-off signal of the illuminating unit 50 via the external connection unit 7. As a result, the illuminating unit 50 turns off the lighting device 51 that is turned on. Then, when terminating lighting of the illuminating unit 50, the processor 82 terminates the processing procedure illustrated in FIG. 8.

Next, with reference to a flowchart of FIG. 9, an example of estimation processing of a human body model OBM executed by the processor 82 in the controller 8 will be described. FIG. 9 is a flowchart illustrating an example of estimation processing of a human body model OBM of the vehicle interior lighting system 1 according to the embodiment. The flowchart illustrated in FIG. 9 illustrates an example of a processing procedure relating to an estimation method of a human body model OBM. The processing procedure illustrated in FIG. 9 is realized by executing a program by the processor 82. The processing procedure illustrated in FIG. 9 is activated by executing step S102 illustrated in FIG. 8 by the processor 82.

First, the processor 82 in the controller 8 of the vehicle interior lighting system 1 extracts a human body area of an object person OB from a depth image (step S201). For example, the processor 82 compares a depth image captured by the imaging unit 3 with an interior image of the interior 101 captured in advance using a well-known background difference method and extracts objects that do not exist in the interior image as a human body area. Upon extracting a human body area, the processor 82 advances processing to step S202.

The processor 82 specifies respective human body parts from the extracted human body area (step S202). For example, the processor 82 specifies predetermined human body parts of a head, shoulders, elbows, hands, hips, knees, and feet from the human body area using a well-known Random Forest. When all human body parts are unable to be specified according to, for example, a direction and a posture of an object person OB, the processor 82 specifies specifiable human body parts. Upon completion of specification, the processor 82 advances processing to step S203.

The processor 82 calculates three-dimensional coordinates of the respective human body parts in a three-dimensional space of the interior 101 (step S203). For example, the processor 82 calculates a center of gravity of each human body part using a well-known Mean Shift method and calculates three-dimensional coordinates of the human body parts based on the center of gravity and a distance indicated by pixels of a depth image. After calculating three-dimensional coordinates of each human body part, the processor 82 advances processing to step S204.

The processor 82 connects the respective human body parts with one another to estimate a human body model OBM (step S204). When storing information indicating a human body model OBM in the estimated three-dimensional space of the interior 101 in the storage unit 81, the processor 82 terminates the processing procedure illustrated in FIG. 9.

The vehicle interior lighting system 1 according to the embodiment of the present invention described above is not limited to the above-described embodiment, and various modifications are possible within the scope described in the claims.

In the above description, the vehicle interior lighting system 1 has been described with respect to control in which the illuminating unit 50 provides lighting service when an object person OB in the rear seat 107 moves in the interior 101, but the present invention is not limited thereto. For example, the vehicle interior lighting system 1 may provide lighting service by the illuminating unit 50 when an object person OB in the driver's seat 105 moves backward in the interior 101.

In the above description, the vehicle interior lighting system 1 has been described in a case where the illuminating unit 50 includes the lighting devices 51, but the present invention is not limited thereto. For example, the illuminating unit 50 may be a lighting device that extends from the rear seat 107 to a back of the rear seat 108 in the interior 101 and that can be partially turned on/off. Further, an illuminating unit may include the lighting unit 5 in addition to the illuminating unit 50 described above.

In the above description, the vehicle interior lighting system 1 has been described in a case where the vehicle 100 is a vehicle having the rear seats 107 and 108, but the present invention is not limited thereto. For example, when the vehicle 100 is a freight car having a loading platform, the vehicle interior lighting system 1 may be provided with the lighting devices 51 on, for example, a ceiling and a floor of the loading platform.

In the above description, the vehicle interior lighting system 1 has been described as a system of which the whole is provided on the surface of the ceiling 102 of the vehicle 100 on the side of the interior 101 and which constitutes an overhead module, but the present invention is not limited to this. For example, the vehicle interior lighting system 1 may have a configuration where the controller 8 is provided outside the housing 2 and electrically connected to each unit via a wiring member. For example, when the controller 8 may be shared by a vehicle ECU that integrally controls each unit of the vehicle 100. Further, in the vehicle interior lighting system 1, the housing 2 may be provided on an entire surface of the ceiling 102 of the interior 101, and the illuminating unit 50 may be incorporated in the housing 2.

A vehicle interior lighting system according to the present embodiment estimates a three-dimensional human body model of an object person from a depth image captured by an imaging unit, predicts a movement intention of an object person in an interior based on the human body model, and controls lighting of an illuminating unit according to the movement intention. As a result, the vehicle interior lighting system can illuminate the illuminating unit according to a movement intention of an object person predicted from a three-dimensional human body model, so that operation of the illuminating unit becomes unnecessary and convenience of the object person who moves in a vehicle can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle interior lighting system comprising: a plurality of lighting devices provided in an interior of a vehicle; a sensor configured to capture a depth image including a distance to an object person in the interior;
a processor configured to:
estimate a three-dimensional human body model of the object person from the depth image;
predict a movement intention of the object person to move from a first seat of the interior of the vehicle to a second seat of the interior of the vehicle based on a movement of the human body model, the second seat is a seat different from the first seat;
control lighting of the plurality of lighting devices according to the movement intention;
predict an intention to start moving which is a psychological effect of the object person who intends to start moving from the first seat and an intention to continue moving which is a psychological effect of the object person who intends to continue moving from the first seat to the second seat;
turn on a first set of the lighting devices, of the plurality of lighting devices, near the object person according to the intention to start moving at predicting the intention to start moving; and
turn on a second set of the lighting devices, of the plurality of lighting devices, at the destination according to the intention to continue moving at predicting the intention to continue moving.

2. The vehicle interior lighting system according to claim 1, wherein the processor is further configured to:
turn off the first set of lighting devices that have been turned on at an origin of the object person when turning on the second set of lighting devices at the destination.

3. The vehicle interior lighting system according to claim 1, wherein the processor is further configured to:
predict an intention to end moving of the object person moving in the interior based on the human body model; and
terminate lighting of the plurality of lighting devices according to the intention to end moving.

4. The vehicle interior lighting system according to claim 2, wherein the processor is further configured to:
predict an intention to end moving of the object person moving in the interior based on the human body model; and
terminate lighting of the plurality of lighting devices according to the intention to end moving.

5. The vehicle interior lighting system according to claim 1, further comprising:
a housing that is provided on a surface of a ceiling of the vehicle on a side of the interior and incorporates the sensor and the processor.

6. The vehicle interior lighting system according to claim 2, further comprising:
a housing that is provided on a surface of a ceiling of the vehicle on a side of the interior and incorporates the sensor and the processor.

7. The vehicle interior lighting system according to claim 3, further comprising:
a housing that is provided on a surface of a ceiling of the vehicle on a side of the interior and incorporates the sensor and the processor.

* * * * *